Patented Feb. 26, 1952

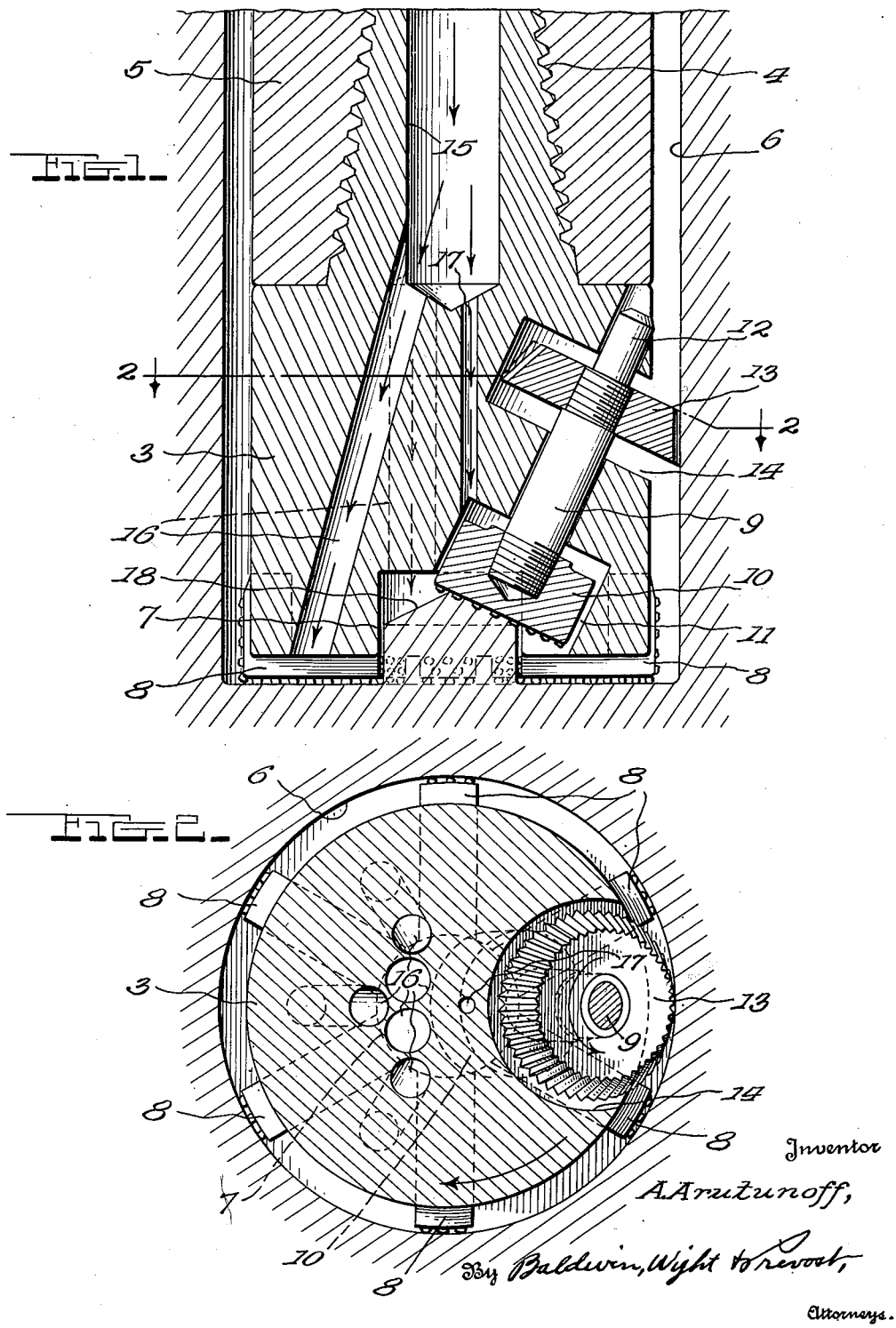

2,587,429

UNITED STATES PATENT OFFICE 2,587,429

DRAG BIT

Armais Arutunoff, Bartlesville, Okla.

Application December 14, 1949, Serial No. 132,847

10 Claims. (Cl. 255—72)

My invention consists in new and useful improvements in a drag bit and has for its object to overcome the difficulties usually encountered heretofore in drilling operations, due to the lack of peripheral velocity at the central portion of the bit, particularly when drilling in hard formations. To this end I have provided a bit comprising a main body or drilling head, having an annular cutting portion, the center of which forms a core receiving recess, into which extends the cutting face of a supplemental, core removing bit, adapted to rotate in a direction reverse to that of the bit head as the latter advances in the bore hole.

Another object of the invention is to provide a novel core removing unit for drag bits, wherein a supplemental bit and a drive wheel are fixed on a common spindle which is rotatably mounted in the head at an acute angle with respect to the longitudinal axis of the head, the supplemental bit being presented to the core which is normally formed in drilling and the drive wheel being arranged for peripheral engagement with the wall of the bore hole. With this arrangement, the supplemental bit is positively driven by the operative engagement of the drive wheel with the bore hole wall as the head advances, and is thus caused to rotate in the reverse direction to progressively remove the core.

A further object of the invention resides in the provision of an inclined core removing unit such as above referred to, which is axially displaceable in the head so that the force encountered by the cutting face of the supplemental bit, causes the unit to be bodily shifted longitudinally of its axis, bringing about a corresponding force in the peripheral engagement of the drive wheel with the wall of the bore hole, to insure positive rotation of the supplemental bit as the head rotates in the bore hole.

A still further object is to provide a core removing unit wherein the diameters of the drive wheel and supplemental bit are so related to one another and to the diameter of the drill head, as to cause a peripheral velocity at the center of the head, approximating that at its periphery.

With the above and other objects in view which will appear as the description proceeds, my invention consists in the novel features herein set forth, illustrated in the accompanying drawings and more particularly pointed out in the appended claims.

Referring to the drawings in which numerals of like character designate similar parts in both views:

Figure 1 is a vertical sectional view showing my improved drag bit head in a bore hole; and Figure 2 is a transverse sectional view taken on line 2—2 of Figure 1.

In the drawings 3 represents the drill head which is preferably cylindrical in cross section and reduced and threaded at its upper end 4 to engage complementary threads on drill shaft 5, by means of which the head is suspended in a bore hole 6. The central portion of the bottom face of the head 3 is recessed as at 7, adjacent which, the head is provided with a series of radially disposed cutting ribs 8 which are substantially L-shaped and extend across the bottom face of the head and thence upwardly against its periphery, to collectively form an annular cutting portion surrounding the recess 7. Each of the cutting ribs 8 is composed of suitable metal and its working faces may be diamond studded or composed of a hard abrasive material such as tungsten carbide or the like.

My improved core removing unit comprises a spindle 9, rotatably mounted in a bearing formed in the body of the head 3 and arranged at an upwardly and outwardly inclined angle with respect to the axis of the head 3, as will be seen from Figure 1. The lower end of the spindle 9 carries a supplemental bit 10 which is fixed thereto by suitable threads or otherwise keyed to rotate with the spindle, a recess or cavity 11 being provided in the head, immediately adjacent and at an angle to the central recess 7. The supplemental bit 10 is preferably in the form of a circular disk and its bottom or working face is diamond studded or formed of a hard material such as tungsten carbide similar to the working faces of the cutting ribs 8.

The opposite end of the spindle 9 is reduced as at 12 to receive the central opening of a substantially frusto-conical drive wheel 13 which is also keyed to the spindle or fixed with respect thereto by suitable threads. A second recess or cavity 14 is provided in the head 3 to accommodate the drive wheel 13 and the reduced end of the spindle is rotatably supported in a suitable bearing adjacent the cavity 14.

The spindle 9, in addition to being rotatably mounted in the head 3, is also displaceable longitudinally of its own axis, and the recesses or cavities 11 and 14 are of sufficient depth to permit the required longitudinal movement of the unit when in operation, so that a longitudinal force or operating pressure, applied to the cutting face of the supplemental bit 10 will simultaneously force the periphery of the cutting wheel 13 into operative engagement with the wall of the bore hole 6. As will best be seen from Figure 2, the periphery of the drive wheel 13 is provided with a series of serrations or teeth to facilitate the driving engagement of the wheel with the wall of the bore hole.

In order to prevent the accumulation of matter and to promote the ease of operation of the drag bit, I preferably employ suitable means for introducing wash water to the cutting areas, during the drilling operation. In the form illustrated, this consists of a central bore 15 into which is connected a series of smaller bores 16, leading to points adjacent the cutting ribs 8, and 17, leading to the cavity 11 which houses the supplemental bit 10, there being sufficient clearance between the periphery of the supplemental bit 10 and the wall of the cavity 11 to permit the free flow of water therethrough and around the bit.

It should be observed that the diameter of the drive wheel 13, with relation to the diameters of the supplemental bit 10 and the drill head 3, is such as to establish a peripheral velocity in the supplemental bit, approximating that of the periphery of the main head 3 as the latter rotates, thus compensating for the normally reduced velocity or lack of velocity at the center of the main drill head.

In operation, referring to Figure 1, it will be seen that the head 3 is inserted in the bore hole 6 and as it rotates the annular cutting portion formed by the cutting ribs 8 advances leaving a core 18 in the central portion of the bore hole, which enters the central recess 7 of the head. Upon contact with the upper extremity of the core 18, the supplemental bit 10 is forced longitudinally of its axis and with it the spindle 9 and the drive wheel 13, until the latter operatively engages the wall of the bore hole 6. The continued rotation of the head 3 thus causes the reverse rotation of the supplemental bit 10, through the action of the drive wheel 13 and spindle 9, so that as the head advances, the central core 18 is progressively cut away by the supplemental bit 10, with a peripheral velocity approximating that at the periphery of the drill head 3. In other words, by the use of this supplemental bit, the center portion of the bore hole is drilled as efficaciously as the outer extremities of said bore hole.

It will thus be seen that my improved drag bit clearly overcomes the disadvantages heretofore encountered because of the lack of peripheral velocity at the center of the drill head and that my arrangement is particularly adaptable for drilling through hard formations which in the past have caused considerable trouble.

From the foregoing it is believed that my invention may be readily understood by those skilled in the art without further description, it being borne in mind that numerous changes may be made in the details of construction without departing from the spirit of the invention as set forth in the following claims.

I claim:

1. In a drag bit including a main cutting head having an internal recess opening at the central portion of the cutting end of said head, a supplemental center-cutting unit comprising a rotary cutting element mounted in said recess on one end of a drive spindle rotatably supported in the head, with its cutting face presented to the central portion of a bore hole being drilled, a peripheral cavity in said main cutting head into which the opposite end of said spindle extends and a drive wheel fixed to said spindle in said cavity, and projecting radially from said cavity for peripheral driving engagement with the wall of a bore hole.

2. In a drag bit including a main cutting head having an internal recess opening at the central portion of the cutting end of said head, a supplemental center-cutting unit comprising a rotary cutting element mounted in said recess on one end of a drive spindle rotatably supported in said head at an acute angle with respect to the longitudinal axis of said head, the cutting face of said element being presented to the central portion of a bore hole being drilled, a peripheral cavity in said main cutting head into which the opposite end of said spindle extends and a drive wheel in said cavity fixed to said spindle and projecting radially from said cavity for peripheral driving engagement with the wall of a bore hole.

3. A drag bit comprising a head having a central core receiving recess in its cutting end, forming an annular cutting portion, a second recess adjoining said core receiving recess, a supplemental core removing bit rotatably mounted in said second recess with its cutting face projecting into said core receiving recess for cutting engagement with a core therein, and a drive wheel operatively connected to said supplemental bit and actuated by engagement with the wall of a bore hole, upon rotation of said head.

4. A drag bit comprising a head having a central core receiving recess in its cutting end, forming an annular cutting portion, a core removing unit comprising a supplemental bit fixed on the lower end of a drive spindle, rotatably mounted in said head, at an acute angle with respect to the longitudinal axis of said head, the cutting face of said supplemental bit projecting into said recess for cutting engagement with a core therein, a peripheral cavity in said head into which the opposite end of said spindle extends and a drive wheel in said cavity, fixed to said spindle and extending radially beyond the head for peripheral engagement with the wall of a bore hole.

5. A drag bit comprising a head having a central core receiving recess in its cutting end, forming an annular cutting portion, a core removing unit comprising a supplemental bit fixed on the end of a drive spindle, rotatably mounted in said head, at an acute angle with respect to the longitudinal axis of said head, said supplemental bit being disposed in a cavity, angularly offset from said recess, the cutting face of said supplemental bit projecting into said core receiving recess for cutting engagement with a core therein, a drive wheel fixed on said spindle adjacent its other end and lying within a second cavity in said head with its periphery protruding radially beyond the head for engagement with the wall of a bore hole.

6. A drag bit as claimed in claim 5 wherein said unit is bodily, axially displaceable between said cavities in said head, whereby an upward force on the cutting face of said supplemental bit, caused by engagement with said core, correspondingly increases the force of the peripheral engagement of said driving wheel with the wall of the bore hole.

7. A drag bit as claimed in claim 5 wherein said unit is arranged for floating action between said cavities, whereby an upward force on the cutting face of said supplemental bit, caused by engagement with said core, effects a corresponding force in the peripheral engagement of said driving wheel with the wall of the bore hole.

8. A drag bit comprising a head having a central core receiving recess in its cutting end, a series of radially disposed cutting ribs extending from said recess to the periphery of said head and forming with said recess, an annular cutting portion, a core removing unit comprising a supplemental bit having a flat circular cutting face and fixed on the lower end of a drive spindle, rotatably mounted in said head at an acute angle with respect to the longitudinal axis of said head, said circular cutting face being presented to a core within said recess, a peripheral cavity in said head into which the opposite end of said spindle extends and a frusto-conical drive wheel in said cavity, fixed to said spindle and extending radially beyond the head for peripheral engagement with the wall of a bore hole, said unit being longitudinally shiftable by engagement of the cutting face of said supplemental bit with a core in said recess.

9. A drag bit as claimed in claim 8 wherein the cutting face of said supplemental bit overlies the top of the core and extends across the center line thereof.

10. A drag bit as claimed in claim 8 wherein the diameter of the drive wheel is so related to that of the supplemental bit and the periphery of the head, as to cause the peripheral velocity of the supplemental bit to substantially equal that at the periphery of the head.

ARMAIS ARUTUNOFF.

REFERENCES CITED

The following references are of record in the file of this patent:

UNITED STATES PATENTS

| Number | Name | Date |
|---|---|---|
| 1,482,397 | Hansen | Feb. 5, 1924 |
| 2,024,730 | Hammer | Dec. 17, 1935 |
| 2,034,073 | Wright | Mar. 17, 1936 |